(12) United States Patent
Maejima et al.

(10) Patent No.: US 11,890,894 B2
(45) Date of Patent: Feb. 6, 2024

(54) RAILWAY WHEEL

(71) Applicant: NIPPON STEEL CORPORATION, Tokyo (JP)

(72) Inventors: Taketo Maejima, Tokyo (JP); Manabu Kubota, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 519 days.

(21) Appl. No.: 17/276,209

(22) PCT Filed: Sep. 27, 2019

(86) PCT No.: PCT/JP2019/038387
§ 371 (c)(1),
(2) Date: Mar. 15, 2021

(87) PCT Pub. No.: WO2020/067520
PCT Pub. Date: Apr. 2, 2020

(65) Prior Publication Data
US 2022/0024247 A1   Jan. 27, 2022

(30) Foreign Application Priority Data

Sep. 28, 2018  (JP) ................ 2018-183040

(51) Int. Cl.
*B60B 17/00*   (2006.01)
*C22C 38/04*   (2006.01)
(Continued)

(52) U.S. Cl.
CPC .......... *B60B 17/0006* (2013.01); *C22C 38/04* (2013.01); *C22C 38/06* (2013.01);
(Continued)

(58) Field of Classification Search
CPC .......... B60B 17/0006; B60B 2360/102; C22C 38/04; C22C 38/06; C22C 38/24; C22C 38/26
See application file for complete search history.

(56) References Cited

U.S. PATENT DOCUMENTS 5,899,516 A    5/1999  Fujimura et al.
7,559,999 B2 * 7/2009  Robles Hernandez ............
                                                C22C 38/44
                                                148/335
(Continued)

FOREIGN PATENT DOCUMENTS

CN   101479392 A    7/2009
EP   2388352 A1    11/2011
(Continued)

OTHER PUBLICATIONS

F. Wever et al.; Zur Frage der Warmebehandlung der Stahle auf Grund ihrer Zeit-Temperatur-Umwandlungs-Schaubilder; Stahl Und Eisen; 74 (1954), pp. 749-761 (See paragraph [0030] of the present specification for a concise explanation).

*Primary Examiner* — S. Joseph Morano
*Assistant Examiner* — Eva L Comino
(74) *Attorney, Agent, or Firm* — Greer Burns & Crain Ltd.

(57) ABSTRACT

The railway wheel according to the present embodiment has a chemical composition consisting of: in mass %, C: 0.80 to 1.15%, Si: 0.45% or less, Mn: 0.10 to 0.85%, P: 0.050% or less, S: 0.030% or less, Al: 0.200 to 1.500%, N: 0.0200% or less, Nb: 0.005 to 0.050%, Cr: 0 to 0.25%, and V: 0 to 0.12%, with the balance being Fe and impurities, wherein at least in the microstructure of the rim part and the web part, the amount of pro-eutectoid cementite defined by Formula (1) is 2.00 pieces/100 μm or less:

Amount of pro-eutectoid cementite(pieces/100 μm)=a total sum of the number of pieces of pro-eutectoid cementite which intersect with two diagonal lines in a square visual field of 200 μm×200 μm/(5.66×100 μm)×100   (1).

4 Claims, 6 Drawing Sheets

(51) Int. Cl.
*C22C 38/06* (2006.01)
*C22C 38/24* (2006.01)
*C22C 38/26* (2006.01)

(52) U.S. Cl.
CPC .............. *C22C 38/24* (2013.01); *C22C 38/26* (2013.01); *B60B 2360/102* (2013.01)

(56) References Cited

U.S. PATENT DOCUMENTS

| | | | |
|---|---|---|---|
| 7,591,909 B2* | 9/2009 | Robles Hernandez | ..................... C22C 38/44 148/335 |
| 11,458,762 B2* | 10/2022 | Maejima | ................ C22C 38/001 |
| 11,761,053 B2* | 9/2023 | Maejima | ................ C22C 38/24 295/30 |
| 2009/0314049 A1 | 12/2009 | Ueda et al. | |
| 2013/0243640 A1 | 9/2013 | Yamamoto et al. | |
| 2015/0147224 A1 | 5/2015 | Yamamoto et al. | |
| 2022/0032681 A1* | 2/2022 | Maejima | ................ C22C 38/02 |

FOREIGN PATENT DOCUMENTS

| | | | | |
|---|---|---|---|---|
| JP | 9202937 A | | 8/1997 | |
| JP | 2004-204206 | * | 7/2004 | ............. C22C 38/04 |
| JP | 2004315928 A | | 11/2004 | |
| JP | 2012107295 A | | 6/2012 | |
| JP | 2013147725 A | | 8/2013 | |
| JP | 2013231212 A | | 11/2013 | |

* cited by examiner

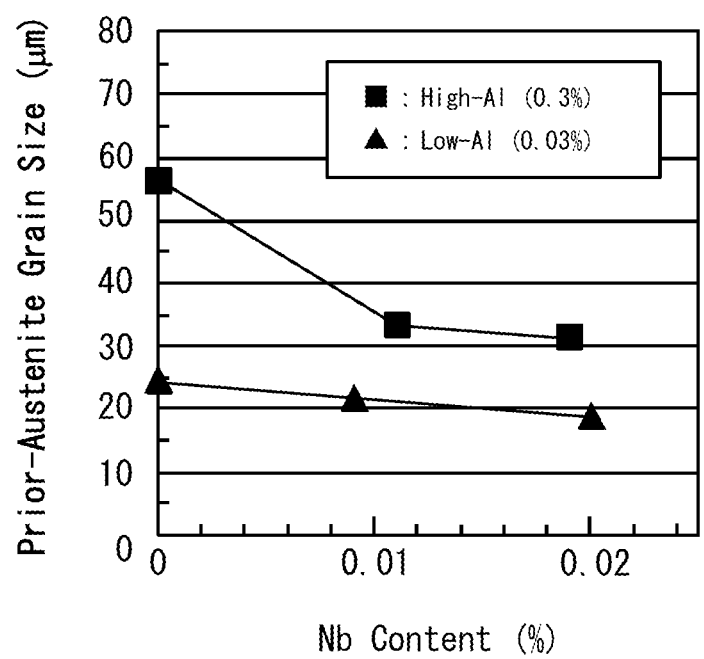

RAILWAY WHEEL

This is a National Phase Application filed under 35 U.S.C. § 371, of International Application No. PCT/JP2019/038387, filed Sep. 27, 2019, the contents of which are incorporated by reference.

TECHNICAL FIELD

The present disclosure relates to a railway wheel.

BACKGROUND ART

A railway vehicle travels on a rail constituting a railway track. A railway vehicle includes a plurality of railway wheels. The railway wheel supports the vehicle, keeps in contact with the rail, and rotates to move on the rail. The railway wheel wears due to the contact with the rail. In recent years, for the purpose of increasing the efficiency of railway transportation, attempts have been made to increase the loading weight on the railway vehicle and to increase the speed of the railway vehicle. As a result of that, there is need of improvement of the wear resistance of railway wheels.

Technologies to improve wear resistance of a railway wheel have been proposed in Japanese Patent Application Publication No. H09-202937 (Patent Literature 1), Japanese Patent Application Publication No. 2012-107295 (Patent Literature 2), Japanese Patent Application Publication No. 2013-231212 (Patent Literature 3), and Japanese Patent Application Publication No. 2004-315928 (Patent Literature 4).

The railway wheel disclosed in Patent Literature 1 consists of, in mass %, C: 0.4 to 0.75%, Si: 0.4 to 0.95%, Mn: 0.6 to 1.2%, Cr: 0 to less than 0.2%, P: less than 0.03%, and S: 0.03% or less, with the balance being Fe and other unavoidable impurities. In this railway wheel, a region from the surface of the wheel tread part to a depth of at least 50 mm is composed of a pearlite structure. A production method of a railway wheel of Patent Literature 1 includes a quenching step in which the wheel tread part is cooled in a condition that a cooling curve of the wheel tread part passes through a pearlite forming region in a continuous cooling transformation curve, and resides on the long-time side of the martensite transformation curve.

Wheel steel disclosed in Patent Literature 2 has a chemical composition consisting of, in mass %, C: 0.65 to 0.84%, Si: 0.02 to 1.00%, Mn: 0.50 to 1.90%, Cr: 0.02 to 0.50%, V: 0.02 to 0.20%, S≤0.04%, P≤0.05%, Cu≤0.20%, and Ni≤0.20%, with the balance being Fe and impurities. The chemical composition further satisfies the following relational expression:

[34≤2.7+29.5×C+2.9×Si+6.9×Mn+10.8×Cr+30.3×Mo+44.3×V≤43] and

[0.76×exp(0.05×C)×exp(1.35×Si)×exp(0.38×Mn)×exp(0.77×Cr)×exp(3.0×Mo)×exp(4.6×V)≤25]

Patent Literature 2 states that this wheel steel achieves excellent wear resistance, rolling fatigue resistance, and spalling resistance by satisfying the above described chemical composition and the Formulae.

The wheel steel disclosed in Patent Literature 3 consists of, in mass %, C: 0.65 to 0.84%, Si: 0.4 to 1.0%, Mn: 0.50 to 1.40%, Cr: 0.02 to 0.13%, S: 0.04% or less, V: 0.02 to 0.12%, with the balance being Fe and impurities, wherein Fn1 defined by Formula (1) is 32 to 43, and Fn2 defined by Formula (2) is 25 or less. Here, Formula (1) is represented by Fn1=2.7+29.5C+2.9Si+6.9Mn+10.8Cr+30.3Mo+44.3V, and Formula (2) is represented by Fn2=exp(0.76)×exp(0.05C)×exp(1.35Si)×exp(0.38Mn)×exp(0.77Cr)×exp(3.0Mo)×exp(4.6V). Patent Literature 3 states that the wheel steel achieves excellent wear resistance, rolling fatigue resistance, and spalling resistance when it has the above described chemical composition, and Fn1 and Fn2 satisfy the above described range.

The railway wheel disclosed in Patent Literature 4 is an integrated railway wheel composed of steel containing a chemical composition consisting of, in mass %, C: 0.85 to 1.20%, Si: 0.10 to 2.00%, Mn: 0.05 to 2.00%, and further as needed, one or more kinds selected from Cr, Mo, V, Nb, B, Co, Cu, Ni, Ti, Mg, Ca, Al, Zr, and N, with the balance being Fe and other unavoidable impurities, wherein at least a part of the tread and/or the flange surface of the railway wheel has a pearlite structure. Patent Literature 4 states that the life of the railway wheel depends on the amount of wear of the tread and the flange surface (paragraph [0002] of Patent Literature 4), and further depends on a crack in the tread and the flange surface which is caused by increase in calorific value when brake is applied in a high-speed railway. It also states that when the railway wheel has the above described configuration, it is possible to suppress wear and heat crack of the tread and the flange surface.

CITATION LIST

Patent Literature

Patent Literature 1: Japanese Patent Application Publication No. H09-202937

Patent Literature 2: Japanese Patent Application Publication No. 2012-107295

Patent Literature 3: Japanese Patent Application Publication No. 2013-231212

Patent Literature 4: Japanese Patent Application Publication No. 2004-315928

Non Patent Literature

Non Patent Literature 1: F. Wever et al., Zur Frage der Warmebehandlung der Stahle auf Grund ihrer Zeit-Temperatur-Umwandlungs-Schaubilder, Stahl u Eisen, 74 (1954), p 749 to 761

SUMMARY OF INVENTION

Technical Problem

In the railway wheel proposed in Patent Literature 1, the Cr content is held to be low and an appropriate amount of Si is contained to obtain an appropriate hardenability and a property to facilitate obtaining a pearlite structure. However, the railway wheel according to Patent Literature 1 contains 0.4 to 0.75% of C, that is, the railway wheel is made of a so-called hypo-eutectoid steel. Therefore, there is limitation on improving wear resistance.

In the wheel steels proposed in Patent Literatures 2 and 3, the pearlite structure is strengthened by making V contained in a steel having a C content of 0.65 to 0.84%, thereby improving wear resistance. However, only containing V has its limitation on improvement of wear resistance.

On the other hand, in the railway wheel proposed in Patent Literature 4, wear resistance is improved by using a hyper-eutectoid steel in which the C content is increased.

By the way, one example of a production method of a railway wheel is as follows. A billet is subjected to hot working to form an intermediate product having a railway wheel shape. The formed intermediate product is subjected to heat treatment (tread quenching). In the tread quenching, the intermediate product is heated, and thereafter the tread and the flange part of the intermediate product are rapidly cooled. As a result of this, a fine pearlite which has high wear resistance is formed in the matrix structure of the near-surface layer of the tread. However, a quenched layer composed of martensite (or martensite and bainite) is formed in a layer above the fine pearlite of the near-surface portion of the tread after tread quenching. The quenched layer is likely to wear during use of a railway wheel. Therefore, after tread quenching, the quenched layer which has been formed at the outer most layer of the tread is removed by cutting such that fine pearlite is exposed to the tread. By the process described so far, a railway wheel is produced.

As described so far, a railway wheel made of a hyper-eutectoid steel has excellent wear resistance. However, when a railway wheel is produced by the above described production method by using a hyper-eutectoid steel, it has become clear that in contrast to hypo-eutectoid steel, pro-eutectoid cementite is likely to be formed in a railway wheel, for example, in a web part or a hub part of the railway wheel. The pro-eutectoid cementite deteriorates toughness of steel. Therefore, it is preferable to be able to suppress formation of pro-eutectoid cementite in a railway wheel made of a hyper-eutectoid steel.

It is an object of the present invention to provide a railway wheel which can suppress formation of pro-eutectoid cementite even if the C content is as high as 0.80% or more.

Solution to Problem

A railway wheel according to the present disclosure includes:
a rim part,
a hub part, and
a web part which is disposed between the rim part and the hub part and is linked to the rim part and the hub part, wherein
a chemical composition of the railway wheel consists of: in mass %,
C: 0.80 to 1.15%,
Si: 0.45% or less,
Mn: 0.10 to 0.85%,
P: 0.050% or less,
S: 0.030% or less,
Al: 0.200 to 1.500%,
N: 0.0200% or less,
Nb: 0.005 to 0.050%,
Cr: 0 to 0.25%, and
V: 0 to 0.12%, with
the balance being Fe and impurities, and wherein
at least in microstructures of the rim part and the web part among the rim part, the hub part, and the web part of the railway wheel, an amount of pro-eutectoid cementite defined by Formula (1) is 2.00 pieces/100 μm or less:

Amount of pro-eutectoid cementite(pieces/100 μm)=a total sum of the number of pieces of pro-eutectoid cementite which intersect with two diagonal lines in a square visual field of 200 μm×200 μm/(5.66×100 μm)×100   (1)

Advantageous Effects of Invention

The railway wheel according to the present embodiment can suppress the amount of pro-eutectoid cementite even when the C content is high.

BRIEF DESCRIPTION OF DRAWINGS

FIG. 10 is a diagram illustrating a relationship between the prior-austenite grain size, which is obtained by the microstructure observation in a high-Al material and a low-Al material shown in Table 1, and the Nb content.

DESCRIPTION OF EMBODIMENTS

[Configuration of railway wheel]

Figure 1:
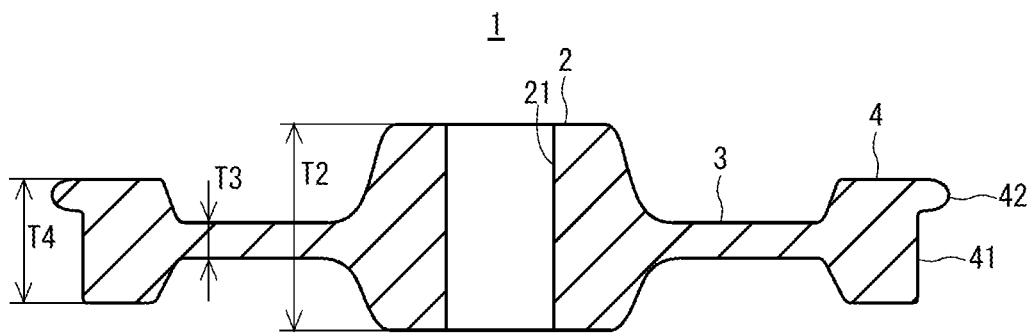
FIG. 1 is a cross sectional view including a center axis of a railway wheel.

FIG. 1 is a cross sectional view including a center axis of a railway wheel according to the present embodiment. Referring to FIG. 1, a railway wheel 1 has a disc shape and includes a hub part 2, a web part 3, and a rim part 4. The hub part 2 has a cylindrical shape and is disposed in a middle part in a radial direction (direction perpendicular to the center axis) of the railway wheel 1. The hub part 2 has a through hole 21. A center axis of the through hole 21 corresponds to the center axis of the railway wheel 1. A railway axle shaft not shown is inserted into the through hole 21. A thickness T2 of the hub part 2 is larger than a thickness T3 of the web part 3. The rim part 4 is formed in an edge part in the outer circumference of the railway wheel 1. The rim part 4 includes a tread 41 and a flange part 42. The tread 41 is linked with the flange part 42. The tread 41 and the flange part 42 are in contact with a rail surface while the railway wheel 1 is used. A thickness T4 of the rim part 4 is larger than the thickness T3 of the web part 3. The web part 3 is disposed between the hub part 2 and the rim part 4 and is linked with the hub part 2 and the rim part 4. Specifically, an inner circumferential edge part of the web part 3 is linked with the hub part 2, and an outer circumference edge part of the web part 3 is linked with the rim part 4. The thickness T3 of the web part 3 is smaller than the thickness T2 of the hub part 2 and the thickness T4 of the rim part 4.

First, the present inventors have studied on the chemical composition appropriate for improving wear resistance in a railway wheel. As a result, it was found that in a railway wheel, wear resistance when used as a railway wheel is improved more when hardness is increased by increasing the C content to be 0.80% or more, than when hardness is increased by increasing the V content even when the same hardness is obtained. Though this mechanism is not clear, the following matters are considered. The tread of the railway wheel being used is subjected to external force (load) from the rail. By this external force, the cementite in the pearlite immediately below the tread is crushed, and the hardness is further increased by dispersion strengthening. Further, carbon in crushed fine cementite dissolves supersaturatedly into ferrite in the pearlite, thereby increasing the hardness of the outer layer immediately below the tread by solid-solution strengthening.

When the C content in steel is increased, the volume fraction of cementite in pearlite will increase, and further pearlite is likely to form finer lamellas. In this case, the wear resistance will be improved by the above described mechanism. In contrast to this, when V is contained in steel, the hardness of steel is increased by precipitation hardening of V carbonitride. In this occasion, since V carbonitride is formed in ferrite, the hardness of ferrite is mostly increased. In other words, when V is contained, although it increases the hardness of ferrite, it does not significantly affect refinement of pearlite. For that reason, although wear resistance can be improved to some extent by containing V, wear resistance cannot be improved as much as by dispersion strengthening by crushed cementite and solid-solution strengthening of C.

Then, the present inventors contemplated that to improve wear resistance, it is preferable to use a hyper-eutectoid steel having a C content of 0.80 to 1.15% in the chemical composition of railway wheel.

However, as a result of investigation by the present inventors, it has been found that in a railway wheel of a hyper-eutectoid steel having a C content of 0.80% or more, pro-eutectoid cementite is likely to be formed. Pro-eutectoid cementite deteriorates toughness of a railway wheel. Accordingly, the present inventors investigated the relationship between the content of each element in the chemical composition and the amount of pro-eutectoid cementite in a railway wheel made of a hyper-eutectoid steel having a high C content. As a result, the following findings have been obtained.

Figure 2:
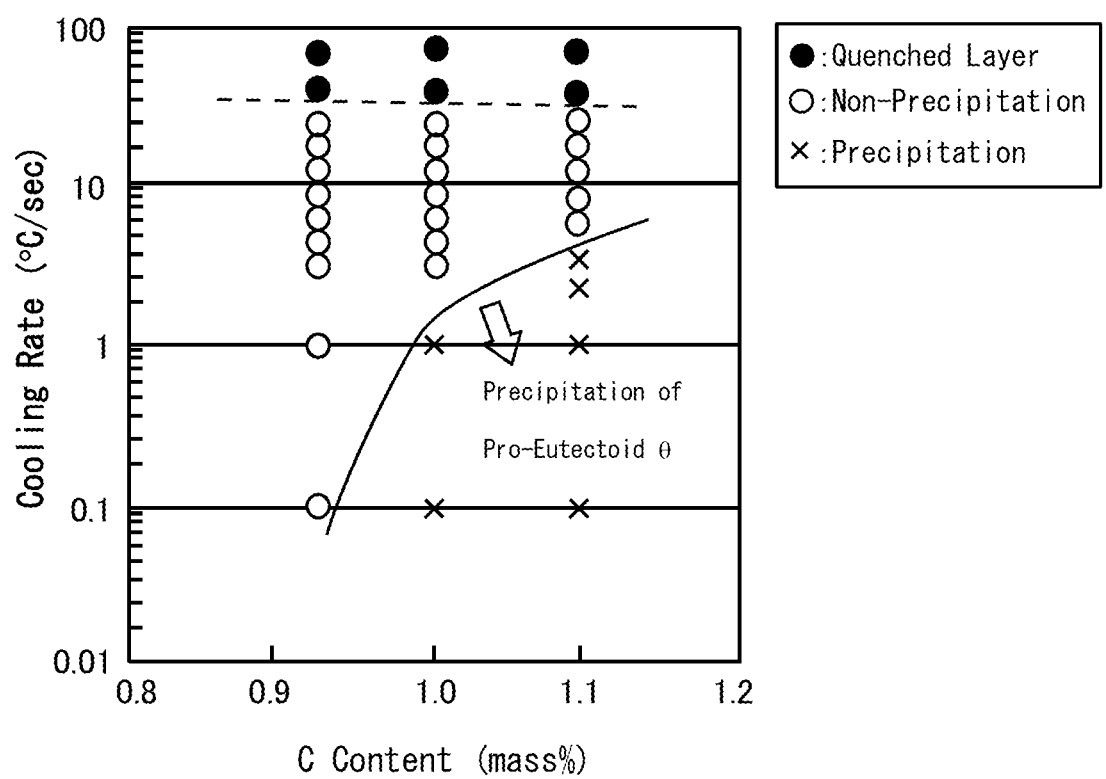
FIG. 2 is a diagram illustrating the relationship among the C content, the cooling rate, and the microstructure in steel, which are obtained by a Jominy end-quench test and a Formaster test.

FIGS. 2 to 7 are each a diagram to illustrate relationship among the content of each element in steel (FIG. 2: C content, FIG. 3: Si content, FIG. 4: Mn content, FIG. 5: Cr content, FIG. 6: Al content, and FIG. 7: V content), the average cooling rate in a range of 800 to 500° C., and pro-eutectoid cementite based on the results of a heat treatment test assuming the heat treatment in the production process of a railway wheel. The reason why the average cooling rate in a range of 800 to 500° C. is specified is that precipitation temperature of pro-eutectoid cementite is 800 to 500° C.

Figure 3:
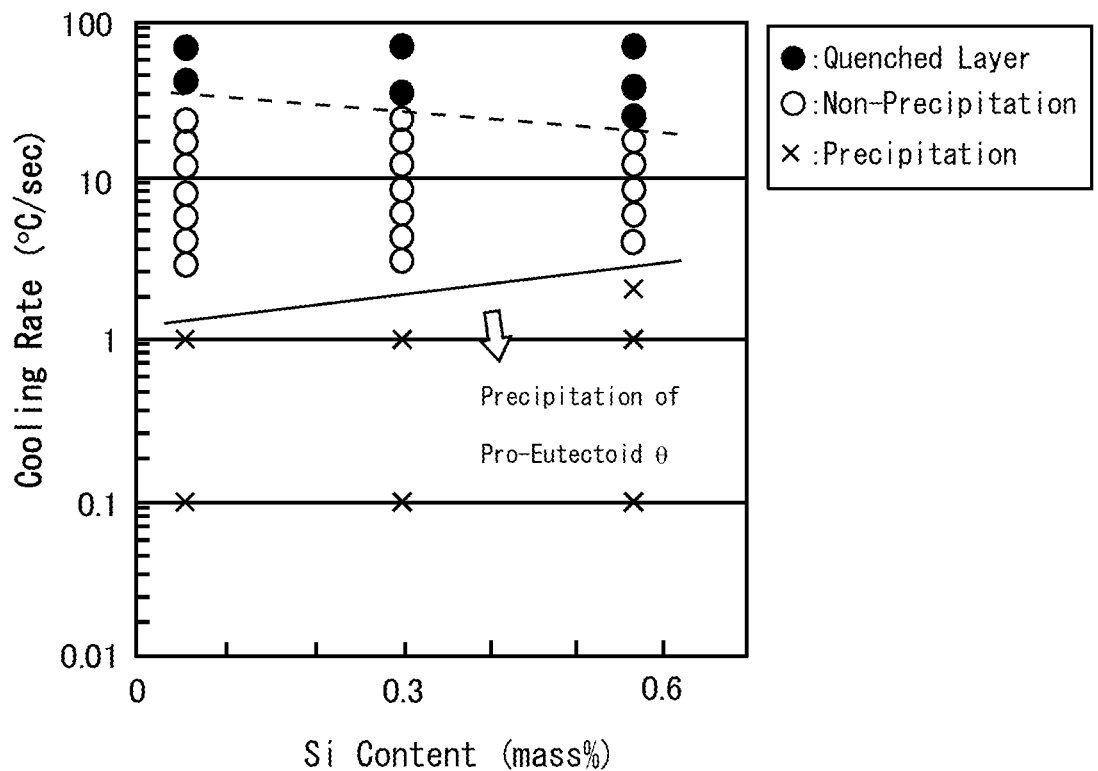
FIG. 3 is a diagram illustrating the relationship among the Si content, the cooling rate, and the microstructure in steel, which are obtained by the Jominy end-quench test and the Formaster test.
Figure 4:
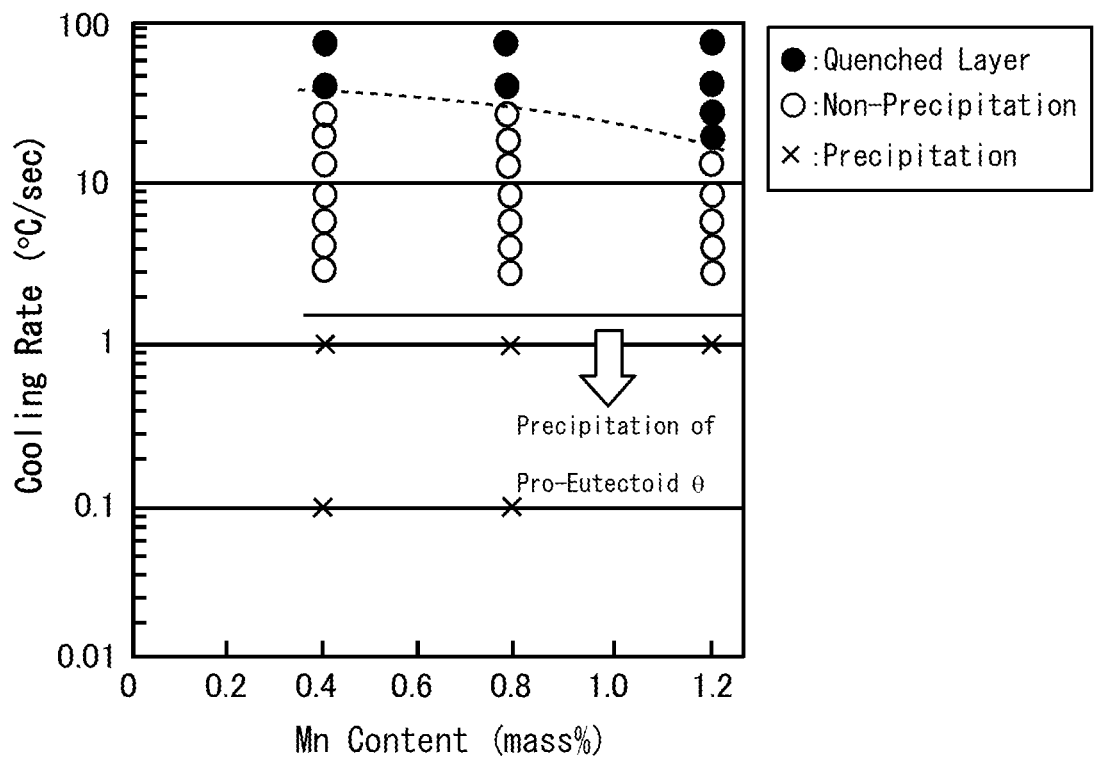
FIG. 4 is a diagram illustrating the relationship among the Mn content, the cooling rate, and the microstructure in steel, which are obtained by the Jominy end-quench test and the Formaster test.
Figure 5:
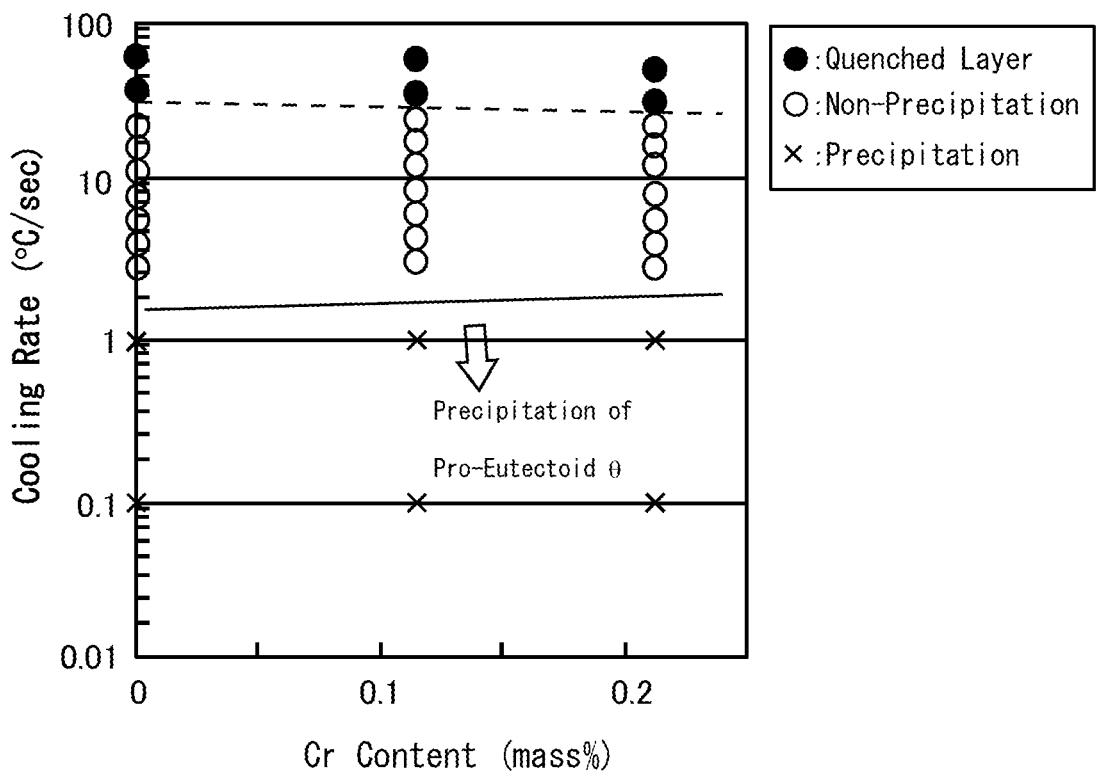
FIG. 5 is a diagram illustrating the relationship among the Cr content, the cooling rate, and the microstructure in steel, which are obtained by the Jominy end-quench test and the Formaster test.
Figure 6:
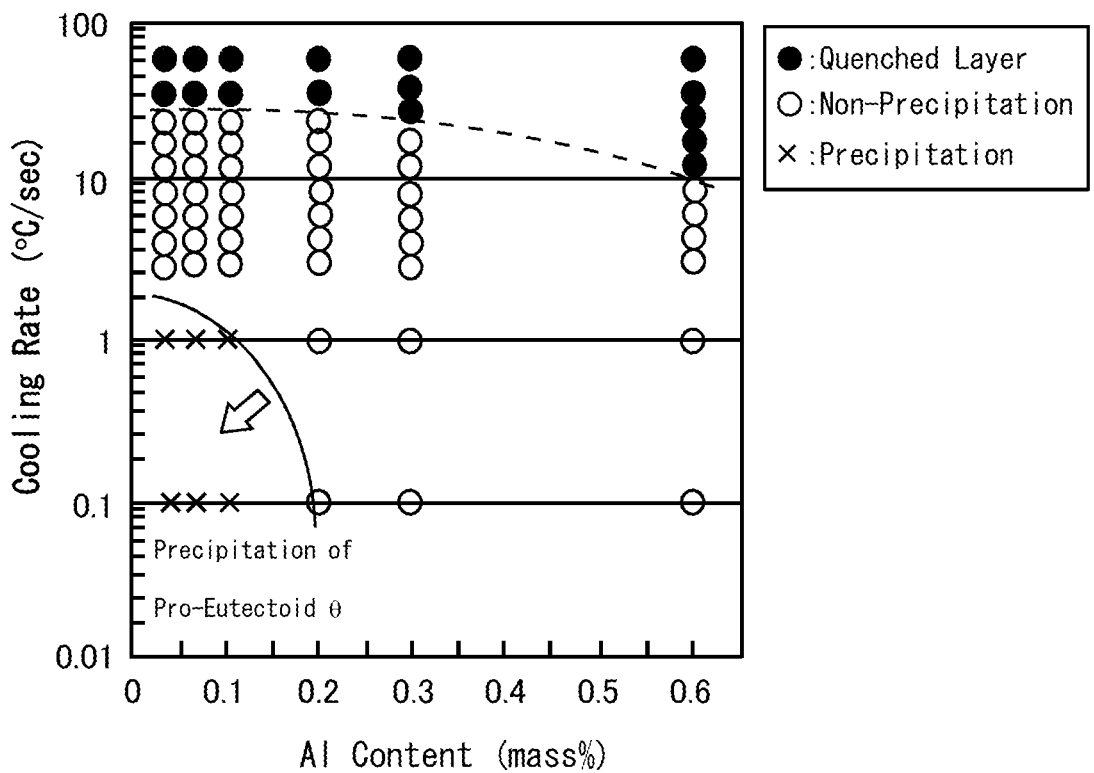
FIG. 6 is a diagram illustrating the relationship among the Al content, the cooling rate, and the microstructure in steel, which are obtained by the Jominy end-quench test and the Formaster test.
Figure 7:
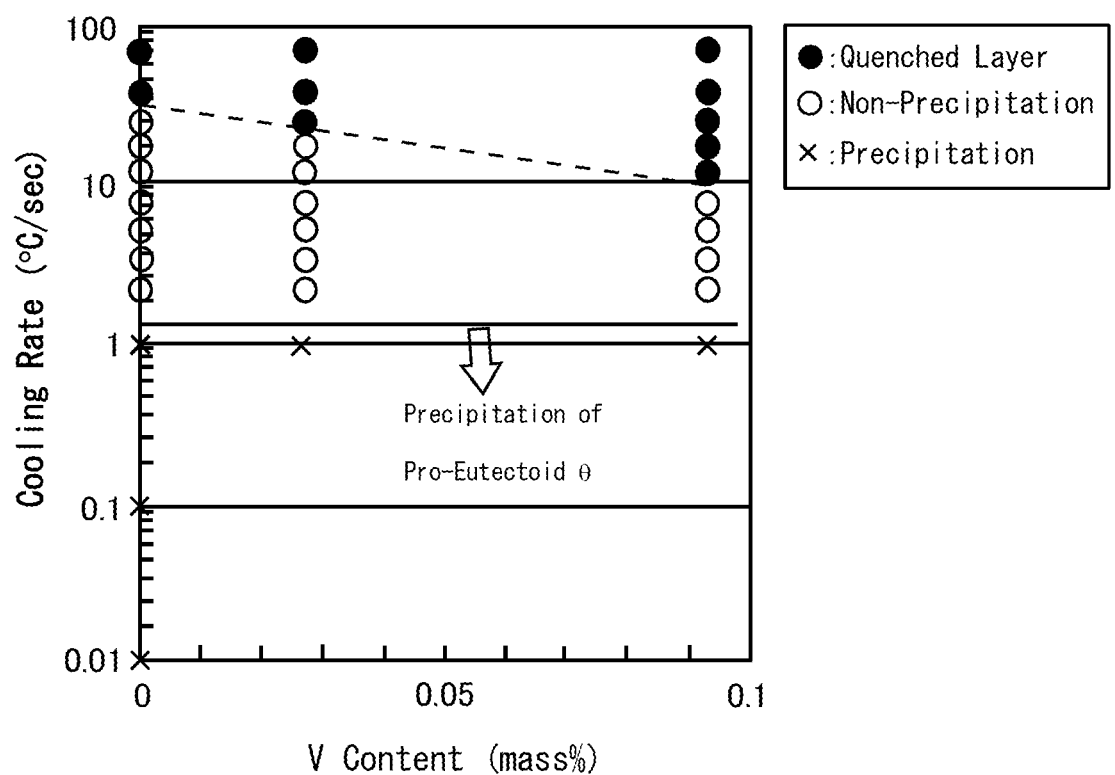
FIG. 7 is a diagram illustrating the relationship among the V content, the cooling rate, and the microstructure in steel, which are obtained by the Jominy end-quench test and the Formaster test.

Specifically, FIG. 2 is created based on the results obtained in a Jominy end-quench test and a Formaster test using a plurality of samples each having a chemical composition consisting of a substantially constant content of each element including Si: 0.29 to 0.30%, Mn: 0.79 to 0.80%, P: 0.001%, S: 0.002%, Al: 0.032 to 0.036%, and N: 0.0040 to 0.0042%, and a varying content of C, with the balance being Fe and impurities. FIG. 3 is created based on the results obtained in the Jominy end-quench test and the Formaster test to be described later using a plurality of samples each having a chemical composition consisting of a substantially constant content of each element including C: 1.00 to 1.03%, Mn: 0.80 to 0.81%, P: 0.001 to 0.002%, S: 0.001 to 0.002%, Al: 0.031 to 0.034%, N: 0.0040 to 0.0042%, and a varying content of Si, with the balance being Fe and impurities. FIG. 4 is created based on the results obtained in the Jominy end-quench test and the Formaster test to be described later using a plurality of samples each having a chemical composition consisting of a substantially constant content of each element including C: 1.00 to 1.04%, Si: 0.29 to 0.31%, P: 0.001 to 0.002%, S: 0.001 to 0.002%, Al: 0.030 to 0.034%, N: 0.0040 to 0.0058%, and a varying content of Mn, with the balance being Fe and impurities. FIG. 5 is created based on the results obtained in the Jominy end-quench test and the Formaster test to be described later using a plurality of samples each having a chemical composition consisting of a substantially constant content of each element including C: 1.00 to 1.05%, Si: 0.29 to 0.30%, Mn: 0.78 to 0.80%, P: 0.001%, S: 0.001 to 0.002%, Al: 0.033 to 0.034%, N: 0.0030 to 0.0040%, and a varying content of Cr, with the balance being Fe and impurities. FIG. 6 is created based on the results obtained in the Jominy end-quench test and the Formaster test to be described later using a plurality of samples each having a chemical composition consisting of a substantially constant content of each element including C: 1.00 to 1.03%, Si: 0.29 to 0.30%, Mn: 0.79 to 0.81%, P: 0.001%, S: 0.001 to 0.002%, N: 0.0034 to 0.0046%, and a varying content of Al, with the balance being Fe and impurities. FIG. 7 is created based on the results obtained in the Jominy end-quench test and the Formaster test to be described later using a plurality of samples each having a chemical composition consisting of C: 1.00 to 1.03%, Si: 0.29 to 0.30%, Mn: 0.80%, P: 0.001 to 0.002%, S: 0.001 to 0.002%, N: 0.0040 to 0.0048%, Al: 0.026 to 0.034%, and a varying content of V, with the balance being Fe and impurities.

The Jominy end-quench test was conducted in the following method. By using Jominy test specimens (round bar test specimen having a diameter of 25 mm and a length of 100 mm) having the above described chemical compositions, the Jominy end-quench test conforming to JIS G0561 (2011) was conducted. Specifically, a Jominy test specimen was held in a furnace of 950° C., which is temperature not less than the $A_{cm}$ transformation point, in the atmosphere for 30 minutes so that the structure of the Jominy test specimen was turned into an austenite single phase. Thereafter, end-quenching (water cooling) was performed. Specifically, the Jominy test specimen was cooled by spraying water to one end thereof.

After water cooling, the side face of the Jominy test specimen which had been subjected to water cooling was mechanically polished, and microstructure observation thereof was performed at a constant interval from the one end (water cooling end) in the axial direction. The observation positions of the microstructure observation were arranged at a pitch of 1.0 mm in a range from the water cooling end to a 15 mm position, and at a pitch of 2.5 mm at positions of 15 mm or more from the water cooling end.

Figure 8:
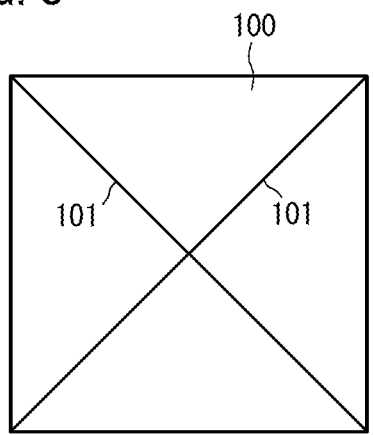
FIG. 8 is a schematic diagram for illustrating a measurement method of the amount of pro-eutectoid cementite.

A sample having a plane including the above described microstructure observation positions as an observation surface was prepared. The observation surface of each sample was mirror-finished by mechanical polishing. Then, the observation surface was etched with a sodium picric acid solution (100 ml of water+2 g of picric acid+25 g of sodium hydroxide), which was an etching solution suitable for revealing pro-eutectoid cementite. In the etching, the sample was immersed in a boiled sodium picric acid solution. A photographic image was obtained using an optical microscope with a magnification of 500 times for any one visual field (200 μm×200 μm) in the observation surface of the sample after etching. In the observation surface, pro-eutectoid cementite that formed at a prior-austenite grain boundary exhibited black color. For that reason, the presence or absence of pro-eutectoid cementite was able to be confirmed. When pro-eutectoid cementite was confirmed, the amount of pro-eutectoid cementite (its unit was pieces/100 μm. Hereinafter, it is also referred to as the amount of pro-eutectoid θ) was determined by the following method. As shown in FIG. 8, two diagonal lines were drawn in the visual field of a square of 200 μm×200 μm. Then, a total sum of the number of pieces of pro-eutectoid cementite intersecting with these two diagonal lines was determined. By dividing the determined total number of pieces of pro-eutectoid cementite by a total length (5.66×100 μm) of the two diagonal lines, the amount of pro-eutectoid θ per 100 μm (pieces/100 μm) was determined.

Next, the same observation surface was mirror finished again by mechanical polishing and etched with a nital solution (a mixed solution of nitric acid and ethanol). A photographic image was produced by using an optical microscope with a magnification of 500 times for any one visual field (200 μm×200 μm) in the observation surface after etching. A quenched layer (martensite and/or bainite) and pearlite had different contrasts. Therefore, based on contrast, the quenched layer and the pearlite in the observation surface were identified. When any quenched layer was confirmed, it was determined that a quenched layer was formed.

Note that the relationship between the distance from the water cooling end during Jominy test and the cooling time from 800 to 500° C. are experimentally shown in Non Patent Literature 1 (F. Wever et al., Zur Frage der Warmebehandlung der Stahle auf Grund ihrer Zeit-Temperatur-Umwandlungs-Schaubilder, Stahl u Eisen, 74 (1954), p 749 to 761). Based on this literature, distance from the water cooling end was converted to obtain an average cooling rate (° C./sec) from 800 to 500° C. at each position.

A case in which the cooling rate is 1° C./sec or less cannot be reproduced by the Jominy end-quench test. Then, for a case in which the cooling rate is 1° C./sec or less, a continuous cooling test (the Formaster test) at a low cooling rate was conducted. A Formaster tester manufactured by Fuji Electronic Industrial Co., Ltd. was used for heat treatment. Specifically, each test specimen was held at 950° C. for 5 minutes. Thereafter, each test specimen was cooled at a constant cooling rate of 1.0° C./sec (or 0.1° C./sec). Microstructure observation was conducted on the test specimen after cooling by the above described method. Then, when pro-eutectoid cementite was confirmed, the amount of pro-eutectoid θ was determined by the above described method.

Based on the results obtained in the methods described so far, FIGS. 2 to 7 were created.

The symbol "○" in FIGS. 2 to 7 indicates that the microstructure is substantially composed of pearlite, and the amount of pro-eutectoid θ in the microstructure is 2.00 pieces/100 μm or less. The symbol "×" means that although no quenched layer is formed in the microstructure and the microstructure is composed of pearlite, the amount of pro-eutectoid θ is more than 2.00 pieces/100 μm. Note that the phrase "the microstructure is substantially composed of pearlite" means that the area fraction of pearlite in the microstructure is 95.0% or more. Moreover, the symbol "●" means that a quenched layer (martensite and/or bainite) is formed.

A maximum cooling rate (cooling rate at a boundary between the symbol "○" and the symbol "●" in the figure) at which the amount of pro-eutectoid θ is formed more than 2.00 pieces/100 μm is defined as a critical cooling rate of pro-eutectoid cementite. The critical cooling rate of pro-eutectoid cementite is shown by a solid line in FIGS. 2 to 7.

In FIG. 2, as the C content increases, the critical cooling rate of pro-eutectoid cementite increases. Moreover, in FIGS. 3, 4, 5, and 7, Si, Mn, Cr, and V each have small effect on the critical cooling rate of pro-eutectoid cementite compared with C and Al.

On the other hand, referring to FIG. 6, as the Al content increases, the critical cooling rate of pro-eutectoid cementite remarkably decreases, resulting in remarkable decrease in the amount of pro-eutectoid θ. In other words, from the results of FIGS. 2 to 7, the present inventors have found that regarding the amount of pro-eutectoid θ in steel, while C has effect of increasing the amount of pro-eutectoid θ, Al has effect of remarkably decreasing the amount of pro-eutectoid θ.

Based on the results of investigation described so far, the present inventors contemplated that in a railway wheel of hyper-eutectoid steel having a C content of 0.80% or more, increasing the Al content would make it possible to suppress the amount of pro-eutectoid θ in a portion in which cooling rate is low during heat treatment in the production process of a railway wheel, and thereby to obtain excellent toughness even in a railway wheel of a hyper-eutectoid steel. Then, based on the above described investigation results, the present inventors have further investigated the chemical composition of the railway wheel of hyper-eutectoid steel to find that if the chemical composition of the railway wheel was chemical composition consisting of, in mass %, C: 0.80 to 1.15%, Si: 0.45% or less, Mn: 0.10 to 0.85%, P: 0.050% or less, S: 0.030% or less, Al: 0.200 to 1.500%, N: 0.0200% or less, Cr: 0 to 0.25%, and V: 0 to 0.12%, with the balance being Fe and impurities, the amount of pro-eutectoid θ can be suppressed not only in the rim part which is rapidly cooled by tread quenching, but also in the web part where cooling rate is low.

However, in the case of a railway wheel having a chemical composition consisting of, in mass %, C: 0.80 to 1.15%, Si: 0.45% or less, Mn: 0.10 to 0.85%, P: 0.050% or less, S: 0.030% or less, Al: 0.200 to 1.500%, N: 0.0200% or less, Cr: 0 to 0.25%, and V: 0 to 0.12%, with the balance being Fe and impurities, it has been found that if the Al content is increased, the quenched layer increases and the prior-austenite grain also increases in size.

Regarding the increase in the quenching layer, as shown in FIG. 6, in the case of the above described chemical composition, if the Al content is increased, the quenched layer (marked with "●" in the figure) is likely to be formed at the time of tread quenching. As described above, the quenched layer is removed by cutting in the production process of the railway wheel. Therefore, if a large amount of quenched layer is formed, the yield decreases in the production process.

Further, if the Al content is increased in the above described chemical composition, coarse AlN is formed. When fine AlN is present, it is possible, by the pinning effect thereof, to suppress the coarsening of austenite grains during heating for tread quenching. However, if AlN coarsens, the pinning effect is not exhibited, and the coarsening of prior-austenite grains is not sufficiently suppressed. It is a well-known technical matter that as prior-austenite grains become finer, the toughness is further enhanced. Therefore, when considering the improvement of toughness, it is preferable that prior-austenite grains are fine.

Accordingly, the present inventors further studied on a railway wheel that can reduce the amount of pro-eutectoid cementite and reduce the quenched layer formed during the production process, and can suppress coarsening of prior-austenite grains by specifying the Al content to be 0.200 to 1.500%. As a result, it has been found that by adding, in place of part of Fe, 0.005 to 0.050% of Nb to the railway wheel having the above-mentioned chemical composition such that the chemical composition of the railway wheel consists of: in mass %, C: 0.80 to 1.15%, Si: 0.45% or less, Mn: 0.10 to 0.85%, P: 0.050% or less, S: 0.030% or less, Al: 0.200 to 1.500%, N: 0.0200% or less, Nb: 0.005 to 0.050%, Cr: 0 to 0.25%, and V: 0 to 0.12%, with the balance being Fe and impurities, it is possible to reduce the quenched layer while keeping the amount of pro-eutectoid θ to be 2.00 pieces/100 μm or less at least in the microstructure of the rim part and the web part, and also suppress the coarsening of prior-austenite grains. This point will be described below.

[Suppression of Formation of Quenched Layer]

Figure 9A:
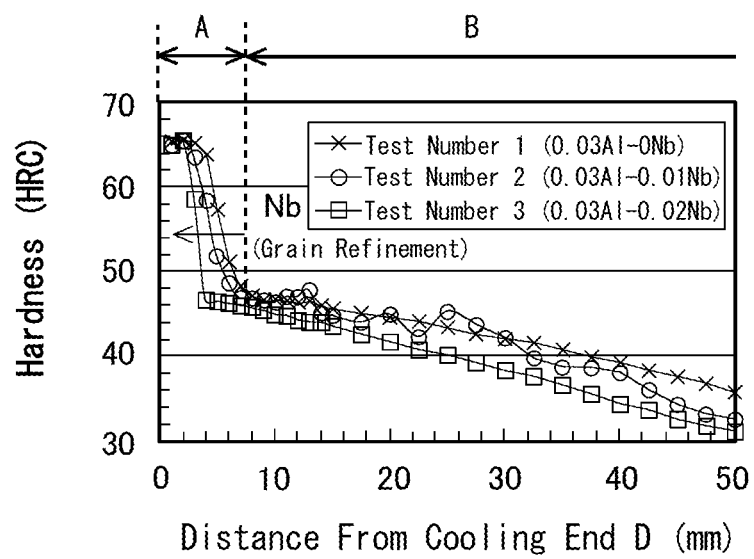
FIG. 9A is a diagram illustrating a relationship between the distance from the water cooling end and Rockwell hardness HRC obtained from a Jominy end-quench test using a test material (low-Al material) which assumes a railway wheel.
Figure 9B:
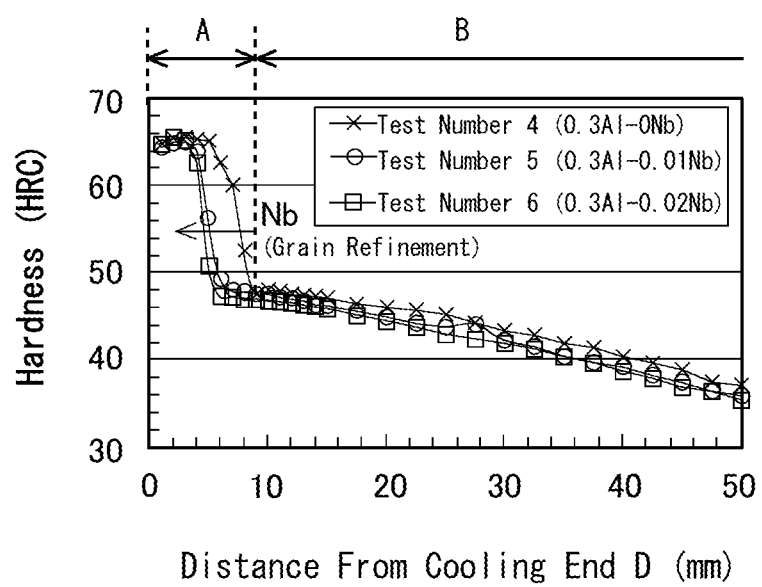
FIG. 9B is a diagram illustrating a relationship between the distance from the water cooling end and Rockwell hardness HRC obtained from the Jominy end-quench test using a test material (high-Al material) which assumes a railway wheel.

FIGS. 9A and 9B are diagrams illustrating a relationship between the distance from the water cooling end and Rockwell hardness HRC obtained from the Jominy end-quench test by use of test materials (high-Al material and low-Al material) which assumed a railway wheel. FIGS. 9A and 9B were obtained by the following method.

Test specimens (round bar specimens having a diameter of 25 mm and a length of 100 mm) having chemical compositions shown in Table 1 were prepared.

TABLE 1

| Test Number | Chemical Composition (unit is mass %, the balance being Fe and impurities) | | | | | | | |
|---|---|---|---|---|---|---|---|---|
| | C | Si | Mn | P | S | Al | N | Nb |
| 1 | 1.00 | 0.30 | 0.80 | ≤0.050 | ≤0.030 | 0.034 | 0.0040 | 0.000 |
| 2 | 1.01 | 0.28 | 0.79 | ≤0.050 | ≤0.030 | 0.030 | 0.0048 | 0.009 |
| 3 | 1.00 | 0.28 | 0.79 | ≤0.050 | ≤0.030 | 0.030 | 0.0050 | 0.020 |
| 4 | 1.00 | 0.29 | 0.81 | ≤0.050 | ≤0.030 | 0.300 | 0.0034 | 0.000 |
| 5 | 1.03 | 0.30 | 0.79 | ≤0.050 | ≤0.030 | 0.290 | 0.0040 | 0.011 |
| 6 | 0.96 | 0.28 | 0.80 | ≤0.050 | ≤0.030 | 0.290 | 0.0044 | 0.019 |

Referring to Table 1, in the following description, Test Numbers 1 to 3 containing about 0.030% of Al are referred to as low-Al materials, and Test Numbers 4 to 6 containing about 0.300% of Al are referred to as high-Al materials. In Table 1, three types of low-Al materials having different Nb contents, and three types of high-Al materials having different Nb contents were prepared. Specifically, for the low-Al material, Test Number 1 containing no Nb, Test Number 2 having an Nb content of about 0.010%, and Test Number 3 having an Nb content of about 0.020% were prepared. For the high-Al material, Test Number 4 containing no Nb, Test Number 5 having an Nb content of about 0.010%, and Test Number 6 having an Nb content of about 0.020% were prepared.

By using the prepared test specimens, the Jominy end-quench test conforming to JIS G0561 (2011) was conducted. Specifically, a Jominy test specimen was held in a furnace of 950° C., which is temperature not less than the $A_{cm}$ transformation point, in the atmosphere for 30 minutes so that the structure of the Jominy test specimen was turned into an austenite single phase. Thereafter, end-quenching (water cooling) was performed. Specifically, the Jominy test specimen was cooled by spraying water to one end thereof.

After water cooling, the side surface of the water-cooled Jominy test specimen was mechanically polished, and Rockwell hardness (HRC) test using the C scale conforming to JIS Z 2245 (2011) was conducted at a constant interval in the axial direction from one end (water-cooled end), to obtain HRC distribution. The measurement interval of HRC was 1.0 mm pitch in a range from the water-cooled end to a 15 mm position, and 2.5 mm pitch at positions of 15 mm or more from the water-cooled end. The resulting HRC were plotted to create FIGS. 9A and 9B.

FIG. 9A shows distributions (Jominy curves) of Rockwell hardness HRC from the water-cooled end of the low-Al materials. FIG. 9B shows distributions (Jominy curves) of Rockwell hardness HRC from the water-cooled end of the high-Al materials. In FIGS. 9A and 9B, the Rockwell hardness HRC rapidly decreases as the distance D from the water-cooled end increases. Further, when D becomes a predetermined distance or more, the Rockwell hardness HRC does not decrease so much even if the distance from the water-cooled end increases. A region A from the water-cooled end to a position of rapid decrease in Rockwell hardness HRC is defined as a "quenched layer". Further, a region B which is a region deeper than the region A and in which the Rockwell hardness HRC has not significantly decreased is defined as a "base metal". Both FIGS. 9A and 9B show a region A (quenched layer) and a region B (base metal) of test numbers containing no Nb (Test Number 1 in FIG. 9A and Test Number 4 in FIG. 9B). The region A and the region B can be separated via an inflection point.

Referring to FIGS. 9A and 9B, in both the low-Al materials (FIG. 9A) and the high-Al materials (FIG. 9B), the quenching layer decreases as the Nb content increases. Comparing the high-Al material and the low-Al material, the reduction of the quenching layer due to the Nb content is more remarkable in the high-Al material than in the low-Al material. Therefore, in a railway wheel having an Al content of 0.250 to 1.500%, if Nb is contained, the formation of a quenched layer can be remarkably suppressed.

[Suppression of Coarsening of Prior-Austenite Grain]

FIG. 10 is a diagram illustrating a relationship between the prior-austenite grain size, which is obtained by the microstructure observation in a high-Al material and a low-Al material shown in Table 1, and the Nb content. FIG. 10 was obtained by the following method. A continuous cooling test (Formaster test) was conducted at a low cooling speed on the test specimens of the above described Test Numbers 1 to 6. Specifically, a Formaster tester manufactured by Fuji Electronic Industrial Co., Ltd. was used for the heat treatment. Specifically, each test specimen was held at 950° C. above the $A_{cm}$ transformation point for 5 minutes. Then, it was cooled to room temperature at a constant cooling rate of 0.01 to less than 0.1° C./sec. The test specimens after cooling was cut to prepare a microstructure observation test specimen. When cooled at these sufficiently low cooling rates, pro-eutectoid cementite has precipitated at prior-austenite grain boundaries. Therefore, the surface (observation surface) of the microstructure observation test specimen was etched with a sodium picric acid solution (100 ml of water+2 g of picric acid+25 g of sodium hydroxide), which is an etching solution suitable for revealing pro-eutectoid cementite. In the etching, the microstructure observation test specimen was immersed in a boiled sodium picric acid solution. The observation surface of the microstructure observation test specimen after etching was observed with an optical microscope with a magnification of 200 times. The observation visual field at 200 times was a square visual field of 500 μm×500 μm. A photographic image of the observation visual field was created. As described so far, in the above described test specimen, since pro-eutectoid cementite has precipitated at prior-austenite grain boundaries, the prior-austenite grains can be identified in the microstructure observation. Then, the grain size of the prior-austenite grain identified in the visual field was determined by an intercept method. Specifically, as shown in FIG. 8, two diagonal lines 101 were drawn in the visual field of the square visual field 100. Then, a total sum of the number of pieces of pro-eutectoid cementite intersecting with these two diagonal lines 101 was determined. Then, the prior-austenite grain size (μm) was determined by the following formula.

Prior-austenite grain size=a total length of two diagonal lines 101/a total number of pieces of pro-eutectoid cementite intersecting with the diagonal lines 101.

Here, the total length of the two diagonal lines 101 was set to 1414 μm.

The prior-austenite grain size obtained in each test number was plotted to obtain FIG. 10. "■" in FIG. 10 indicates the result of the high-Al material. "▲" in FIG. 10 indicates the result of the low-Al material.

Referring to FIG. 10, in both the low-Al material and the high-Al material, the prior-austenite grain size decreases as the Nb content increases. Comparing the high-Al material and the low-Al material, the high-Al material has exhibited more remarkable refinement of prior-austenite grains as the Nb content increases. Therefore, in a railway wheel having an Al content of 0.250 to 1.500%, if Nb is contained, prior-austenite grains can be kept fine.

As so far described, when the chemical composition of a railway wheel is a chemical composition consisting of, in mass %, C: 0.80 to 1.15%, Si: 0.45% or less, Mn: 0.10 to 0.85%, P: 0.050% or less, S: 0.030% or less, Al: 0.200 to 1.500%, N: 0.0200% or less, Cr: 0 to 0.25%, and V: 0 to 0.12%, with the balance being Fe and impurities, if Nb: 0.005 to 0.050% is further contained in place of part of Fe, the quenched layer will be remarkably reduced, and prior-austenite grains can be kept fine. Although the reason of this is not clear, the following matters are considered.

If the Al content is set to 0.200% or more, formation of pro-eutectoid cementite can be remarkably suppressed (FIG. 6). However, since the Al content is high, AlN coarsens. It is considered that in the production process of a railway wheel having the above described chemical composition, AlN is generated in the cooling process (solidification process) of molten steel and dissolves during reheating before hot working. In the case of the above described Al content, AlN remains without dissolving sufficiently during heating before hot working. Therefore, AlN in a railway wheel tends to coarsen. The coarsened AlN does not function as a pinning particle when heated during tread quenching. For that reason, austenite grains coarsen in the heating stage during tread quenching. Since coarsening of austenite grains causes enhancement of the hardenability, the quenched layer will have been formed more deeply after the tread quenching.

On the other hand, when 0.005 to 0.050% of Nb is contained in a railway wheel having the above described Al content, fine NbC is formed during the heating for tread quenching. Since the formed NbC functions as a pinning particle, it suppresses coarsening of austenite grains and keeps them fine. As a result, it is possible to suppress the hardenability, thereby decreasing the depth of the quenched layer. Furthermore, since prior-austenite grains are kept fine, sufficient toughness can be achieved.

Note that it is also conceivable to contain V to form VC, and make VC function as a pinning particle. However, in the case of the above described chemical composition, VC has a lower solid solution temperature than NbC. For that reason, the VC will have dissolved during the heating for tread quenching and cannot function as a pinning particle. When V is contained, as described above, in the cooling step of tread quenching, VC precipitates in ferrite to strengthen the ferrite, but it is considered not possible to refine austenite grains as pinning particles.

Since the above described mechanism is an assumption, there is possibility that formation of quenched layer is suppressed by a different mechanism, and the prior-austenite grains are refined. However, it is clear from FIGS. 9A, 9B, and 10 that if Nb is contained in the railway wheel having the above described chemical composition, formation of a quenched layer is suppressed and prior-austenite grains are refined.

The railway wheel of the present embodiment, which has been completed based on the above described findings, has the following configuration.

[1]

A railway wheel including:

a rim part, a hub part, and a web part which is disposed between the rim part and the hub part and is linked to the rim part and the hub part, wherein a chemical composition of the railway wheel consists of: in mass %, C: 0.80 to 1.15%, Si: 0.45% or less, Mn: 0.10 to 0.85%, P: 0.050% or less, S: 0.030% or less, Al: 0.200 to 1.500%, N: 0.0200% or less, Nb: 0.005 to 0.050%, Cr: 0 to 0.25%, and V: 0 to 0.12%, with the balance being Fe and impurities, and wherein at least in microstructures of the rim part and the web part among the rim part, the hub part, and the web part of the railway wheel, an amount of pro-eutectoid cementite defined by Formula (1) is 2.00 pieces/100 μm or less:

Amount of pro-eutectoid cementite(pieces/100 μm)=a total sum of the number of pieces of pro-eutectoid cementite which intersect with two diagonal lines in a square visual field of 200 μm×200 μm/(5.66×100 μm)×100    (1).

[2]
The railway wheel according to [1], wherein
in the microstructures of the rim part, the hub part, and the web part of the railway wheel, the amount of pro-eutectoid cementite defined by Formula (1) is 2.00 pieces/100 μm or less.

[3]
The railway wheel according to [1] or [2], wherein
the chemical composition contains one or more elements selected from the group consisting of:
Cr: 0.02 to 0.25%, and
V: 0.02 to 0.12%.

Hereinafter, the railway wheel of the present embodiment will be described in detail. In the present description, the symbol "%" regarding elements means, unless otherwise stated, mass %.

[Chemical Composition of Railway Wheel]

The chemical composition of the railway wheel of the present embodiment contains the following elements.

C: 0.80 to 1.15%

Carbon (C) increases the hardness of steel and increases the wear resistance of the railway wheel. If the C content is less than 0.80%, this effect cannot be achieved even if the contents of other elements are within a range of the present embodiment. On the other hand, if the C content is more than 1.15%, a large amount of pro-eutectoid cementite may precipitate at prior-austenite grain boundaries even if the contents of other elements are within a range of the present embodiment. In this case, toughness of the railway wheel deteriorates. Therefore, the C content is 0.80 to 1.15%. The lower limit of the C content is preferably 0.85%, more preferably 0.87%, further preferably 0.90%, and further preferably 0.95%. The upper limit of the C content is preferably 1.10%, and more preferably 1.05%.

Si: 0.45% or Less

Silicon (Si) is unavoidably contained. In other words, the Si content is more than 0%. Si solid-solution strengthens ferrite to increase the hardness of steel. However, if the Si content is more than 0.45%, pro-eutectoid cementite, which may cause deterioration of toughness of steel, becomes likely to be formed even if the contents of other elements are within a range of the present embodiment. If the Si content is more than 0.45%, the hardenability of steel becomes too high, and martensite becomes likely to be formed. In such a case, the thickness of the quenched layer formed on the tread at the time of tread quenching increases. As a result, the amount of cutting increases and the yield decreases. Further, if the Si content is more than 0.45%, quenching is caused by friction heat generated between the railway wheel and the brake during use of the railway wheel. In such a case, crack resistance of the railway wheel may deteriorate. Therefore, the Si content is 0.45% or less. The upper limit of the Si content is preferably 0.35%, and more preferably 0.25%. The lower limit of the Si content will not be particularly limited. However, excessive decrease of the Si content will increase the production cost. Therefore, the lower limit of the Si content is preferably 0.01%, and more preferably 0.05%.

Mn: 0.10 to 0.85%

Manganese (Mn) solid-solution strengthens ferrite, thereby increasing the hardness of steel. Mn further forms MnS to improve the machinability of steel. If the Mn content is less than 0.10%, these effects cannot be achieved even if the contents of other elements are within a range of the present embodiment. On the other hand, if the Mn content is more than 0.85%, the hardenability of steel becomes too high even if the contents of other elements are within a range of the present embodiment. In such a case, the thickness of the quenched layer increases, and the yield in the production process decreases. Further, quenching is caused by friction heat generated between the railway wheel and the brake during use of the railway wheel and crack resistance of the railway wheel may deteriorate. Therefore, the Mn content is 0.10 to 0.85%. The lower limit of the Mn content is preferably 0.50%, and more preferably 0.70%. The upper limit of the Mn content is preferably 0.84%, and more preferably 0.82%.

P: 0.050% or Less

Phosphorus (P) is an unavoidably contained impurity. In other words, the P content is more than 0%. P segregates at grain boundaries to deteriorate the toughness of steel. Therefore, the P content is 0.050% or less. The upper limit of the P content is preferably 0.030%, and more preferably 0.020%. The P content is preferably as low as possible. However, excessive decrease of the P content will increase the production cost. Therefore, in consideration of ordinary industrial manufacturing, the lower limit of the P content is preferably 0.001%, and more preferably 0.002%.

S: 0.030% or Less

Sulfur (S) is unavoidably contained. In other words, the S content is more than 0%. S forms MnS and enhances the machinability of steel. On the other hand, if the S content is too high, the toughness of steel deteriorates. Therefore, the S content is 0.030% or less. The upper limit of the S content is preferably 0.020%. Excessive reduction of the S content will increase the production cost. Therefore, the lower limit of the S content is preferably 0.001%, more preferably 0.002%, and further preferably 0.005%.

Al: 0.200 to 1.500%

Aluminum (Al) suppresses formation of pro-eutectoid cementite which causes deterioration of the toughness of steel. If the Al content is less than 0.200%, the above described effects cannot be sufficiently achieved even if the contents of other elements are within a range of the present embodiment. On the other hand, if the Al content is more than 1.500%, the amount of coarse non-metallic inclusions increases, thereby deteriorating the toughness and fatigue strength of steel even if the contents of other elements are within a range of the present embodiment. Therefore, the Al content is 0.200 to 1.500%. The lower limit of the Al content is preferably 0.250%, more preferably 0.270%, further preferably 0.300%, further preferably 0.400%, and further preferably 0.500%. The upper limit of the Al content is preferably 1.450%, more preferably 1.400%, and further preferably 1.350%. The Al content as used herein means the content of acid-soluble Al (sol. Al).

N: 0.0200% or Less

Nitrogen (N) is an unavoidably contained impurity. If the N content is more than 0.0200%, AlN will coarsen, thereby deteriorating the toughness of steel. Therefore, the N content is 0.0200% or less. The upper limit of the N content is preferably 0.0100%, and more preferably 0.0080%. The N content is preferably as low as possible. However, excessive decrease of the N content will increase the production cost. Therefore, in consideration of ordinary industrial manufacturing, the lower limit of the N content is preferably 0.0001%, more preferably 0.0010%, and further preferably 0.0030%.

Nb: 0.005 to 0.050%

Niobium (Nb) combines with C to form fine NbC during heating for tread quenching in the production process of a railway wheel. Fine NbC functions as a pinning particle to suppress coarsening of austenite during heating. For that reason, the prior-austenite grains are kept fine, thereby suppressing the hardenability of steel. As a result, formation of a quenched layer in the production process of a railway wheel is suppressed. Nb further enhances the toughness of steel material by suppressing the coarsening of prior-austenite grains. If the Nb content is less than 0.005%, the above described effect cannot be sufficiently achieved even if the contents of other elements are within a range of the present embodiment. On the other hand, if the Nb content is more than 0.050%, the NbC coarsens and the toughness of the steel material rather deteriorates even if the contents of other elements are within a range of the present embodiment. Therefore, the Nb content is 0.005 to 0.050%. The lower limit of the Nb content is preferably 0.007%, and more preferably 0.009%. The upper limit of the Nb content is preferably 0.030%, and more preferably 0.023%.

The balance of the chemical composition of the railway wheel according to the present embodiment consists of Fe and impurities. Here, an impurity means an element, which is introduced from ores and scraps as the raw material, or from a production environment, etc., when the above described railway wheel is industrially produced, and which is permitted within a range not adversely affecting the railway wheel of the present embodiment. Examples of impurities other than the above described impurities are O, Cu, Ni, and Mo. The contents of these impurity elements are as follows: O: 0.0070% or less, Cu: 0.20% or less, and preferably 0.05% or less, Ni: 0.20% or less, and preferably 0.05% or less, and Mo: 0.07% or less, and preferably 0.05% or less.

[Optional Elements]

The chemical composition of the railway wheel of the present embodiment may contain Cr in place of part of Fe.

Cr: 0 to 0.25%

Chromium (Cr) is an optional element and may not be contained. In other words, the Cr content may be 0%. When contained, Cr decreases the lamellar spacing of pearlite. This significantly increases the hardness of pearlite. However, if the Cr content is more than 0.25%, the hardenability becomes excessively high even if the contents of other elements are within a range of the present embodiment, and the thickness of the quenched layer after tread quenching increases excessively. Therefore, the Cr content is 0 to 0.25%. The lower limit of the Cr content is preferably more than 0%, more preferably 0.01%, further preferably 0.02%, and further preferably 0.03%. The upper limit of the Cr content is preferably 0.24%, more preferably 0.23%, and further preferably 0.22%.

The chemical composition of the railway wheel of the present embodiment may further contain V in place of part of Fe.

V: 0 to 0.12%

Vanadium (V) is an optional element and may not be contained. In other words, the V content may be 0%. When contained, V forms any of carbide, nitride and carbonitride, thereby precipitation strengthening steel (specifically, ferrite in steel). As a result, the hardness of the railway wheel is increased, thereby further enhancing wear resistance. However, if the V content is more than 0.12%, the hardenability becomes high, and the thickness of the quenched layer after tread quenching increases excessively. Therefore, the V content is 0 to 0.12%. The lower limit of the V content is preferably more than 0%, more preferably 0.01%, further preferably 0.02%, and further preferably 0.03%. The upper limit of the V content is preferably 0.11%, and more preferably 0.10%.

[Amount of Pro-Eutectoid Cementite]

In a railway wheel according to the present embodiment, at least in the microstructures of the rim part and the web part among the rim part, the hub part, and the web part, the amount of pro-eutectoid cementite (amount of pro-eutectoid $\theta$) defined by Formula (1) is 2.00 pieces/100 µm or less:

Amount of pro-eutectoid $\theta$ (pieces/100 µm)=a total sum of the number of pieces of pro-eutectoid cementite which intersect with two diagonal lines in a square visual field of 200 µm×200 µm/(5.66×100 µm)×100     (1)

Specifically, among the rim part, the hub part, and the web part of the railway wheel, in the microstructure of the rim part, the amount of pro-eutectoid $\theta$ defined by Formula (1) is 2.00 pieces/100 µm or less, and in the microstructure of the web part, the amount of pro-eutectoid $\theta$ defined by Formula (1) is 2.00 pieces/100 µm or less.

As described above, if the amount of pro-eutectoid $\theta$ is large especially in the rim part, which comes into contact with the rail, among the rim part, the web part, and the hub part of the railway wheel, and the web part which is the thinnest part among the rim part, the web part, and the hub part, the toughness of the railway wheel deteriorates. The railway wheel of the present embodiment contains 0.200 to 1.500% of Al. In the case of the chemical composition of the above described hyper-eutectoid steel, by containing 0.200 to 1.500% of Al, the amount of pro-eutectoid $\theta$ is remarkably reduced in the railway wheel after the tread quenching step during the production process, and can be held to be 2.00 pieces/100 µm or less at least in the microstructures of the rim part and the web part. The upper limit of the amount of pro-eutectoid $\theta$ is preferably 1.60 pieces/100 µm, more preferably 1.50 pieces/100 µm, further preferably 1.40 pieces/100 µm, further preferably 1.20 pieces/100 µm, and further preferably 1.00 pieces/100 µm.

Preferably, in the microstructures of the rim part, the hub part, and the web part of a railway wheel, the amount of pro-eutectoid $\theta$ defined by Formula (1) is 2.00 pieces/100 µm or less. In other words, the amount of pro-eutectoid $\theta$ defined by Formula (1) is 2.00 pieces/100 µm or less in the microstructure of the rim part, and the amount of pro-eutectoid $\theta$ defined by Formula (1) is 2.00 pieces/100 µm or less in the microstructure of the web part, and the amount of pro-eutectoid $\theta$ defined by Formula (1) is 2.00 pieces/100 µm or less in the microstructure of the hub part. In this case, the toughness of a railway wheel is further enhanced. The upper limit of the amount of pro-eutectoid $\theta$ in the microstructures of the rim part, the hub part, and the web part is preferably 1.60 pieces/100 µm, more preferably 1.50 pieces/100 µm, further preferably 1.40 pieces/100 µm, further preferably 1.20 pieces/100 µm, and further preferably 1.00 pieces/100 µm.

The amount of pro-eutectoid $\theta$ is measured by the following method. Samples are taken from a middle position in the thickness direction of the rim part, a middle position in the thickness direction of the web part, and a middle position in the thickness direction of the hub part of a railway wheel. The observation surface of each sample is mirror-finished by mechanical polishing. Then, the observation surface is etched with a sodium picric acid solution (100 ml of water+2 g of picric acid+25 g of sodium hydroxide). In the etching, the sample is immersed in a boiled sodium picric acid solution. A photographic image is produced using an optical microscope with a magnification of 500 times for any one visual field (200 µm×200 µm) in the observation surface after etching. In the observation surface, pro-eutectoid cementite which is formed at a prior-austenite grain boundary has a black color. Therefore, it is possible to confirm the presence or absence of pro-eutectoid cementite. As shown in FIG. 8, two diagonal lines 101 are drawn in a square visual field 100 of 200 μm×200 μm. Then, a total sum of the number of pieces of pro-eutectoid cementite that intersect with these two diagonal lines 101 is determined. By dividing the determined total number of pieces of pro-eutectoid cementite by a total length (5.66×100 μm) of the two diagonal lines 101 (that is, based on Formula (1)), the amount of pro-eutectoid θ (pieces/100 μm) is determined.

[Microstructure of Railway Wheel]

The microstructure of the rim part, the web part, and the hub part of the railway wheel of the present embodiment is substantially composed of pearlite. Here, the phrase "substantially composed of pearlite" means that the area fraction of pearlite in the microstructure is 95.0% or more.

The area fraction of pearlite is determined by the following method. Samples are taken from each of a middle position in the thickness direction of the rim part, a middle position in the thickness direction of the web part, and a middle position in the thickness direction of the hub part of the railway wheel. The observation surface of each sample is mirror-finished by mechanical polishing. Thereafter, the observation surface is etched with the nital solution (a mixed solution of nitric acid and ethanol). A photographic image is produced for any one visual field (500 μm×500 μm) in the observation surface after etching by using an optical microscope with a magnification of 500 times. The quenched layer (martensite and/or bainite) and pearlite have different contrasts. Therefore, based on contrast, the quenched layer and pearlite in the observation surface are identified. The area fraction of pearlite is determined based on a total area of the identified pearlite and the area of the observation surface.

[Production Method of Railway Wheel]

One example of a method for producing the above described railway wheel will be described. This production method includes a step of producing railway wheel steel (starting material production step), a step of forming an intermediate product having a wheel shape from the railway wheel steel (forming step), a step of performing heat treatment (tread quenching) for the formed intermediate product (heat treatment step), and a step of obtaining a railway wheel by removing a quenched layer from a tread etc., of the intermediate product after the heat treatment (cutting step). Hereinafter, each step will be described.

[Starting Material Production Step]

In the starting material production step, molten steel having the above described chemical composition are melted by using an electric furnace or a converter, etc., and thereafter cast to obtain steel ingots. Note that the steel ingot may be either a cast piece by continuous casting, or an ingot cast with a mold.

The cast piece or ingot is subjected to hot working to produce a steel material for railway wheel having a desired size. Examples of hot working include hot forging, hot rolling, and others. When the steel material for railway wheel is produced by hot rolling, for example, the steel material for railway wheel is produced by the following method. In the hot rolling, for example, a blooming mill is used. A blooming mill is used to perform blooming on the starting material to produce a steel material for railway wheel. When a continuous rolling mill is installed in the downstream of the blooming mill, the steel material after blooming may be further subjected to hot rolling by use of the continuous rolling mill to further produce a steel material for railway wheel. In the continuous rolling mill, a horizontal stand having a pair of horizontal rolls and a vertical stand having a pair of vertical rolls are alternately arranged in a row. The heating temperature of the heating furnace in the hot rolling is, although not particularly limited, for example, 1100 to 1350° C. The steel material for railway wheel is produced by the above described production process.

Note that the steel material for railway wheel may be a cast material (cast piece or ingot). In other words, the above described hot working may be omitted. According to the process described above, a steel material for railway wheel which is the starting material for a railway wheel is produced. The steel material for railway wheel is, for example, a starting material having a cylindrical shape.

[Forming Step]

In the forming step, an intermediate product having a wheel shape is formed by hot working by using the prepared steel material for railway wheel. Since the intermediate product has a wheel shape, it includes a hub part, a web part, and a rim part including a tread and a flange part. Examples of the hot working include hot forging, hot rolling, and the like.

The heating temperature of the steel material for railway wheel during hot working is preferably 1220° C. or more. In this case, AlN and NbC in the steel material for railway wheel sufficiently dissolve in the heating step during hot working. The lower limit of the heating temperature during hot working is preferably 1230° C., more preferably 1250° C., and further preferably 1300° C. The upper limit of the heating temperature during hot working is preferably 1350° C.

Note that the cooling method of the intermediate product after the hot working will not be particularly limited. It may be allowed to cool in the air, or may be water cooled.

[Heat Treatment Step]

In the heat treatment step, the formed intermediate product having a wheel shape is subjected to tread quenching. Specifically, the intermediate product after the hot working (hot forging or hot rolling) is reheated to $Ac_m$ transformation point or higher (reheating treatment). After heating, the tread and the flange part of the intermediate product are subjected to rapid cooling (tread quenching). For example, the tread and the flange part are cooled with a cooling medium. The cooling medium is, for example, air, mist, and steam (spray), and is not particularly limited provided that a cooling rate appropriate for a desired structure can be obtained. Note that at the time of tread quenching, the web part and the hub part are allowed to cool without being water cooled. In the present embodiment, by setting the Al content in the chemical composition of a railway wheel to 0.200 to 1.500%, it is possible to sufficiently suppress formation of pro-eutectoid cementite even if the web part and the hub part are allowed to cool at the time of tread quenching as in a conventional production method. Specifically, the amount of pro-eutectoid θ can be held to be 2.00 pieces/100 μm or less in the rim part, the web part, and the hub part. Further, by containing 0.005 to 0.050% of Nb, fine NbC is formed at the time of heating in the heat treatment step, and it functions as a pinning particle. As a result, coarsening of prior-austenite grains is suppressed.

The diameter of the railway wheel of the present embodiment is, for example, 700 mm to 1000 mm. Moreover, a preferable cooling rate for the tread at the time of tread quenching is 5 to 200° C./sec. Moreover, in the rim part and the web part of the intermediate product at the time of tread quenching, a preferable cooling rate for a region where cooling rate is lowest is 0.1° C./sec or more. In this case, at least in the microstructures of the rim part and the web part among the rim part, the web part, and the hub part of a railway wheel, the amount of pro-eutectoid θ will be 2.00 pieces/100 μm or less. A region of the intermediate product where cooling rate is lowest can be determined, for example, by measuring the change of temperature distribution of the intermediate product during tread cooling by using a plurality of thermographic devices. More preferably, the cooling rate of the region where the cooling rate is lowest among the regions of the rim part, the web part, and the hub part of the intermediate product during tread quenching is 0.1° C./sec or more. In this case, the amount of pro-eutectoid θ is 2.00 pieces/100 μm or less in the microstructures of the rim part, the web part, and the hub part of the railway wheel.

As a result of the tread quenching, fine pearlite is formed on the outer layer of the tread. The C content of the railway wheel of this embodiment is as high as 0.80 to 1.15%. Therefore, the wear resistance of fine pearlite is improved. Moreover, the Al content of the railway wheel of the present embodiment is as high as 0.200 to 1.500%. For that reason, during tread quenching, the formation of pro-eutectoid cementite, which causes deterioration in the toughness of steel, is suppressed. Further, by containing 0.005 to 0.050% of Nb, fine NbC is formed at the time of heating in the heat treatment step, and it functions as a pinning particle. As a result, coarsening of the prior-austenite grains is suppressed. Since the prior-austenite grains are kept fine, the hardenability of the steel material can be suppressed, and as a result, the formation of the quenched layer is also suppressed.

In the above description, the intermediate product is reheated, but the intermediate product after the hot working may be directly subjected to the tread quenching (without being reheated).

Further, in the above description, the web part and the hub part are allowed to cool during the tread quenching, but when the web part and the hub part are allowed to cool, a quenched layer is unlikely to be formed on the surfaces of the web part and the hub part. On the other hand, at the time of tread quenching, the web part and the hub part may be cooled at a cooling rate higher than that when they are allowed to cool. In this case, it is preferable to cool at a level of cooling rate at which a quenching layer is not formed on the surfaces of the web part and the hub part.

The intermediate product after the tread quenching is subjected to tempering as necessary. It is sufficient if the tempering is performed at a well-known temperature and time. The tempering temperature is, for example, 400 to 600° C.

[Cutting Step]

As described above, while fine pearlite is formed in the outer layer of the tread of the intermediate product after the heat treatment, a quenched layer is formed in the layer thereabove. Since the wear resistance of the quenched layer is poor in uses of railway wheel, the quenched layer is removed by cutting. It is sufficient if the cutting is performed by a well-known method. As described above, the railway wheel of the present embodiment contains 0.005 to 0.050% of Nb, so that the formation of a quenched layer can be suppressed. Therefore, the yield in the production process can be increased.

The railway wheel of the present embodiment is produced by the above processes. In the railway wheels produced in the above described production process, the amount of pro-eutectoid θ is 2.00 pieces/100 μm or less. Therefore, it is considered that the toughness of a railway wheel is enhanced. Further, by containing Nb, the prior-austenite grain size can be suppressed to a small size, and the toughness of a railway wheel can be kept sufficiently high.

EXAMPLES

Example 1

Molten steels of Steel No. 1 to 17 having chemical compositions shown in Table 2 were produced.

TABLE 2

| Test Number | Chemical Composition (unit is mass %, the balance being Fe and impurities) | | | | | | | | | | Pearlite Area Fraction (%) |
|---|---|---|---|---|---|---|---|---|---|---|---|
| | C | Si | Mn | P | S | Al | N | Nb | Cr | V | |
| 1 | 1.00 | 0.30 | 0.80 | 0.001 | 0.002 | 0.034 | 0.0040 | 0.000 | 0.00 | 0.00 | ≥95.0 |
| 2 | 1.03 | 0.29 | 0.79 | 0.001 | 0.001 | 0.063 | 0.0041 | 0.000 | 0.00 | 0.00 | ≥95.0 |
| 3 | 1.03 | 0.29 | 0.80 | 0.001 | 0.001 | 0.100 | 0.0044 | 0.000 | 0.00 | 0.00 | ≥95.0 |
| 4 | 1.03 | 0.29 | 0.80 | 0.001 | 0.001 | 0.200 | 0.0046 | 0.000 | 0.00 | 0.00 | ≥95.0 |
| 5 | 1.00 | 0.29 | 0.81 | 0.001 | 0.002 | 0.300 | 0.0034 | 0.000 | 0.00 | 0.00 | ≥95.0 |
| 6 | 1.00 | 0.30 | 0.80 | 0.001 | 0.002 | 0.610 | 0.0034 | 0.000 | 0.00 | 0.00 | ≥95.0 |
| 7 | 1.01 | 0.28 | 0.79 | 0.001 | 0.001 | 0.030 | 0.0048 | 0.009 | 0.00 | 0.00 | ≥95.0 |
| 8 | 1.00 | 0.28 | 0.79 | 0.001 | 0.001 | 0.030 | 0.0050 | 0.020 | 0.00 | 0.00 | ≥95.0 |
| 9 | 1.03 | 0.30 | 0.79 | 0.001 | 0.001 | 0.290 | 0.0040 | 0.011 | 0.00 | 0.00 | ≥95.0 |
| 10 | 0.96 | 0.28 | 0.80 | 0.001 | 0.001 | 0.290 | 0.0044 | 0.019 | 0.00 | 0.00 | ≥95.0 |
| 11 | 1.00 | 0.29 | 0.80 | 0.001 | 0.001 | 0.450 | 0.0042 | 0.008 | 0.00 | 0.00 | ≥95.0 |
| 12 | 0.99 | 0.28 | 0.79 | 0.012 | 0.009 | 0.590 | 0.0031 | 0.020 | 0.00 | 0.00 | ≥95.0 |
| 13 | 0.99 | 0.28 | 0.79 | 0.012 | 0.009 | 0.900 | 0.0037 | 0.020 | 0.00 | 0.00 | ≥95.0 |
| 14 | 1.01 | 0.29 | 0.79 | 0.001 | 0.001 | 1.220 | 0.0039 | 0.022 | 0.00 | 0.00 | ≥95.0 |
| 15 | 1.02 | 0.28 | 0.81 | 0.001 | 0.001 | 0.570 | 0.0035 | 0.003 | 0.00 | 0.00 | ≥95.0 |
| 16 | 1.03 | 0.28 | 0.80 | 0.001 | 0.001 | 0.430 | 0.0041 | 0.012 | 0.10 | 0.00 | ≥95.0 |
| 17 | 0.98 | 0.29 | 0.80 | 0.001 | 0.001 | 0.440 | 0.0038 | 0.017 | 0.00 | 0.03 | ≥95.0 |

| Test Number | Prior-γ Grain Size (μm) | Depth of Quenched Layer (mm) | Amount of Pro-eutectoid θ (pieces/100 μm) | | Charpy Impact Value (J/cm$^2$) | Remarks |
|---|---|---|---|---|---|---|
| | | | Cooling Rate 1.0° C./sec | Cooling Rate 0.1° C./sec | | |
| 1 | 25 | 9.0 | 2.40 | 4.80 | — | Comparative Example |
| 2 | 28 | 9.0 | 2.93 | 2.93 | — | Comparative Example |
| 3 | 30 | 10.0 | 2.67 | 2.93 | — | Comparative Example |
| 4 | 47 | 9.0 | 0.27 | 1.33 | — | Comparative Example |

TABLE 2-continued

| | | | | | | |
|---|---|---|---|---|---|---|
| 5 | 57 | 10.0 | 0.00 | 0.27 | 12.8 | Comparative Example |
| 6 | 81 | 17.5 | 0.00 | 0.27 | — | Comparative Example |
| 7 | 22 | 7.0 | 2.67 | 4.53 | — | Comparative Example |
| 8 | 19 | 4.0 | 2.67 | 5.07 | — | Comparative Example |
| 9 | 33 | 7.0 | 0.80 | 1.60 | 15.3 | Inventive Example |
| 10 | 31 | 7.0 | 0.80 | 1.33 | 15.9 | Inventive Example |
| 11 | 33 | 8.0 | 0.27 | 0.80 | — | Inventive Example |
| 12 | 30 | 7.0 | 0.00 | 0.80 | 16.3 | Inventive Example |
| 13 | 33 | 8.0 | 0.00 | 0.53 | 17.0 | Inventive Example |
| 14 | 35 | 10.0 | 0.00 | 0.27 | — | Inventive Example |
| 15 | 71 | 14.0 | 0.00 | 0.27 | — | Comparative Example |
| 16 | 33 | 10.0 | 0.27 | 0.80 | — | Inventive Example |
| 17 | 31 | 10.0 | 0.00 | 0.80 | — | Inventive Example |

In Table 2, "0.00" means that the content of a corresponding element was below a detection limit. Simulating the starting material production step of the production process of a railway wheel, a round ingot (a truncated cone shape having an upper face diameter of 107 mm, a bottom face diameter of 97 mm, and a height of 230 mm) was produced by an ingot-making process using the above described molten steel. Simulating the forming step in the production process of railway wheel, the ingot was heated to 1250° C. and thereafter was hot forged to produce a round bar having a diameter of 40 mm.

[Simulated Tread Quenching Test]

A simulated tread quenching test which simulated tread quenching during the production process of a railway wheel was conducted, and the amount of pro-eutectoid θ after the simulated tread quenching test was investigated.

[Measurement Test of Amount of Pro-Eutectoid θ]

A heat treatment test specimen having a diameter of 3 mm and a length of 10 mm was prepared from a D/4 depth position in the radial direction ("D" indicates the diameter of the round bar) from the surface of the round bar of each test number. The longitudinal direction of the heat treatment test specimen corresponded to the direction of center axis of the round bar.

A continuous cooling test was conducted using the prepared heat treatment test specimens. A Formaster tester manufactured by Fuji Electronic Industrial Co., Ltd. was used for the heat treatment. Specifically, two test specimens for each steel number were prepared and held at 950° C. for 5 minutes. After that, one of the test specimens was cooled at a constant cooling rate of 1.0° C./sec. The other one of the test specimens was cooled at a constant cooling rate of 0.1° C./sec. For each test specimen after cooling, the amount of pro-eutectoid θ was determined by the following method.

A sample was fabricated in which a cross section perpendicular to the longitudinal direction of the heat treatment test specimen was used as the observation surface. On the observation surface, the amount of pro-eutectoid θ was measured by the following method. The observation surface was mechanical polished, and then, the observation surface was etched with a sodium picric acid solution (100 ml of water+2 g of picric acid+25 g of sodium hydroxide). In the etching, the sample was immersed in a boiled sodium picric acid solution. A photographic image was generated by using an optical microscope with a magnification of 500 times for any one visual field (200 μm×200 μm) in the observation surface after etching. Based on contrast, the pro-eutectoid cementite in the observation field was confirmed. When pro-eutectoid cementite was observed, the amount of pro-eutectoid θ was calculated by the above method.

[Quenched Layer Depth Measurement Test]

Further, the Jominy end-quench test was conducted regarding the depth of the quenched layer. The Jominy end-quench test was conducted in the following method. A Jominy test specimen having a diameter of 25 mm and a length of 100 mm was fabricated from a round bar having a diameter of 40 mm of each steel number. The center axis of the Jominy test specimen corresponded to the center axis of the round bar. A Jominy end-quench test conforming to JIS G0561 (2011) was conducted using the Jominy test specimen. Specifically, the Jominy test specimen was held in a furnace of 950° C. which is a temperature not less than the $A_{cm}$ transformation point in the atmosphere for 30 minutes, to turn the structure of the Jominy test specimen into an austenite single phase. Thereafter, end-quenching (water cooling) was performed. Specifically, the Jominy test specimen was cooled by spraying water to one end thereof.

After water cooling, a side face of the Jominy test specimen which had been subjected to water cooling was mechanically polished and a Rockwell hardness (HRC) test using the C scale conforming to JIS Z 2245 (2011) was conducted at a constant interval in the axial direction from the one end (water cooling end) to obtain HRC distribution. The measurement interval of HRC was a 1.0 mm pitch in a range from the water-cooled end to a 15 mm position, and a 2.5 mm pitch at positions of 15 mm or more from the water cooling end. From the obtained HRC distribution, a quenched layer thickness was determined by the following method.

A Jominy curve shown in FIG. 9A or 9B was created for the steel material of each test number. As described above, in the Jominy curve, a region A in which Rockwell hardness HRC rapidly decreased was defined as a "quenched layer", and a region B in which Rockwell hardness HRC did not decrease so much was defined as a "base metal". The region A and the region B can be separated via an inflection point. A quenched layer thickness (mm) was determined by identifying the region A from HRC distribution (Jominy curve) of each steel number.

Note that a microstructure observation test was conducted on a Jominy test specimen of each test number after Jominy end-quench test to determine a pearlite area fraction in the microstructure in a region in which no quenched layer was formed. Specifically, a sample was taken from a portion corresponding to the region B (base metal) of the Jominy test specimen of each steel number. The observation surface of each sample was mirror finished by mechanical polishing. Thereafter, the observation surface was etched with nital solution (mixed solution of nitric acid and ethanol). A photographic image was produced for any one visual field (500 μm×500 μm) in the observation surface after etching by using an optical microscope with a magnification of 500 times. Pearlite in the observation surface was identified based on contrast. The area fraction of pearlite was determined based on a total area of the identified pearlite and the area of the observation surface.

[Measurement Test of Prior-Austenite Grain Size]

A heat treatment test specimen having a diameter of 3 mm and a length of 10 mm was fabricated from a D/4 depth position in the radial direction from the surface of the round bar of each test number. The longitudinal direction of the heat treatment test specimen corresponded to the direction of center axis of the round bar.

A continuous cooling test was conducted using the fabricated heat treatment test specimen. A Formaster tester manufactured by Fuji Electronic Industrial Co., Ltd. was used for the heat treatment. Specifically, a test specimen for each test number was held at 950° C. for 5 minutes. Thereafter, the test specimen was cooled at a cooling rate of 0.01 to less than 0.1° C./sec. A sample was fabricated in which a cross section perpendicular to the longitudinal direction of each test specimen after cooling was used as the observation surface. After the observation surface was mechanically polished, the observation surface was etched with a sodium picric acid solution (100 ml of water+2 g of picric acid+25 g of sodium hydroxide). In the etching, the sample was immersed in a boiled sodium picric acid solution. A photographic image was produced by using an optical microscope with a magnification of 200 times for any one visual field in the observation surface after etching. The observation area was a square of 500 μm×500 μm. By judging that a portion where pro-eutectoid cementite was precipitated was a grain boundary of prior-austenite grain based on contrast, prior-austenite grains were identified. The grain size of the identified prior-austenite grains was determined by an intercept method. Specifically, as shown in FIG. 8, two diagonal lines 101 were drawn in the visual field of the square visual field 100. Then, a total sum of the number of pieces of pro-eutectoid cementite (prior-austenite grain boundaries) that intersect with these two diagonal lines 101 was calculated. Then, the grain size (μm) of prior-austenite grains was determined by the following formula.

Grain size of prior-austenite grain=a total length of two diagonal lines 101/a total number of pieces of pro-eutectoid cementite intersecting with diagonal lines 101.

Here, the total length of the two diagonal lines 101 was 1414 μm.

[Test Results]

Test results are shown in Table 2. Referring to Table 2, the microstructure in a region other than the quenched layer was structure substantially composed of pearlite in any test number. In other words, the area fraction of pearlite was 95.0% or more.

Further, the chemical compositions of Test Numbers 9 to 14, 16, and 17 were appropriate. Therefore, the amount of pro-eutectoid θ was 2.00 pieces/100 μm or less in both cases of the cooling rate of 0.1° C./sec and 1.0° C./sec. Therefore, it was expected that excellent toughness could be obtained. Furthermore, the prior-austenite grain size was 40 μm or less, and it was expected that excellent toughness could be obtained. Further, the quenched layer depth was suppressed to 10.0 mm or less.

On the other hand, in Test Numbers 1 to 8, the Al content and/or the Nb content was low. Therefore, in both cases of the cooling rate of 0.1° C./sec and 1.0° C./sec, the amount of pro-eutectoid θ was more than 2.00 pieces/100 μm (Test Numbers 1 to 3, 7, and 8). Moreover, the prior-austenite grain size was more than 40 μm (Test Numbers 4 to 6). Note that in Test Number 6, the Al content was higher than that in Test Number 5 so that the thickness of the quenched layer was more than 10.0 mm.

In Test Number 15, the Nb content was low. For that reason, the prior-austenite grain size was more than 40 μm.

Example 2

Among Test Numbers 1 to 17 of Table 2, a round bar having a diameter of 40 mm of Test Number 5, in which the contents of elements other than Nb were appropriate, and round bars having a diameter of 40 mm of Test Numbers 9, 10, 12 and 13, in which the contents of all the elements were appropriate, were used to evaluate the toughness by the following method. Specifically, three square-bar-shaped materials, which had a width of 12 mm, a height of 12 mm, and a length of 70 mm, were collected from each of the round bars of Test Numbers 5, 9, 10, 12, and 13. The square-bar-shaped material was collected from the round bar while avoiding a range of a radius of 4 mm from the central axis thereof. The longitudinal direction of the square-bar-shaped material was parallel to the longitudinal direction of the round bar.

A continuous cooling test simulating tread quenching was conducted for the square-bar-shaped material. A thermal cycle tester manufactured by Fuji Electronic Industrial Co., Ltd. was used for the heat treatment. The square-bar-shaped material was held at 950° C. for 5 minutes. Thereafter, the square-bar-shaped material was cooled at a constant cooling rate of 1.0° C./sec. Through the processes described above, heat treatment to simulate the production process of a railway wheel was performed. After the heat treatment, the square-bar-shaped material was subjected to machining to fabricate a U-notch test specimen having a width of 10 mm, a height of 10 mm, and a length of 55 mm.

The produced U-notch test specimens were subjected to the Charpy impact test conforming to JIS Z 2242 (2005) in the atmosphere at a room temperature to determine Charpy impact values (J/cm$^2$). An average of three values was defined as the Charpy impact value (J/cm$^2$) of that test number. Table 2 shows obtained Charpy impact values (J/cm$^2$).

Referring to Table 2, the Charpy impact values of Test Numbers 9, 10, 12, and 13, which were inventive examples, were higher compared to that of Test Number 5 in which the Nb content was too low. Specifically, the Charpy impact values of Test Numbers 9, 10, 12, and 13 were 13.0 J/cm$^2$ or more.

Embodiments of the present invention have been described so far. However, the above described embodiments are merely examples for practicing the present invention. Therefore, the present invention will not be limited to the above described embodiments, and the present invention can be practiced by appropriately modifying the above described embodiments within a range not departing from the spirit thereof.

REFERENCE SIGNS LIST

1 Railway wheel
2 Hub part
3 Web part
4 Rim part
41 Tread
42 Flange

The invention claimed is:

1. A railway wheel, comprising:
 a rim part,
 a hub part, and
 a web part which is disposed between the rim part and the hub part and is linked to the rim part and the hub part, wherein
 a chemical composition of the railway wheel consists of: in mass %,
 C: 0.80 to 1.15%,
 Si: 0.45% or less,
 Mn: 0.10 to 0.85%,
 P: 0.050% or less,
 S: 0.030% or less,
 Al: 0.200 to 1.500%,
 N: 0.0200% or less,
 Nb: 0.005 to 0.050%,
 Cr: 0 to 0.25%, and
 V: 0 to 0.12%, with
 the balance being Fe and impurities, and wherein
 at least in microstructures of the rim part and the web part among the rim part, the hub part, and the web part of the railway wheel, an amount of pro-eutectoid cementite defined by Formula (1) is 2.00 pieces/100 μm or less:

Amount of pro-eutectoid cementite(pieces/100 μm)=a total sum of the number of pieces of pro-eutectoid cementite which intersect with two diagonal lines in a square visual field of 200 μm×200 μm/(5.66×100 μm)×100    (1).

2. The railway wheel according to claim 1, wherein
 in the microstructure of the rim part, the hub part, and the web part of the railway wheel, the amount of pro-eutectoid cementite defined by Formula (1) is 2.00 pieces/100 μm or less.

3. The railway wheel according to claim 1, wherein
 the chemical composition contains one or more elements selected from the group consisting of:
 Cr: 0.02 to 0.25%, and
 V: 0.02 to 0.12%.

4. The railway wheel according to claim 2, wherein
 the chemical composition contains one or more elements selected from the group consisting of:
 Cr: 0.02 to 0.25%, and
 V: 0.02 to 0.12%.

* * * * *